Sept. 24, 1963 W. T. FROST 3,104,455

METHOD OF MANUFACTURING MAGNETIC TRANSDUCER HEAD

Filed Aug. 10, 1959

*INVENTOR.*
WILLIAM T. FROST
*BY*
William J. Flynn
ATTORNEY

United States Patent Office
3,104,455
Patented Sept. 24, 1963

3,104,455

METHOD OF MANUFACTURING MAGNETIC TRANSDUCER HEAD

William T. Frost, Menlo Park, Calif., assignor to Clevite Corporation, Cleveland, Ohio, a corporation of Ohio Filed Aug. 10, 1959, Ser. No. 832,632
5 Claims. (Cl. 29—155.5)

This invention relates to a method of manufacturing a magnetic transducer head. Such heads are used for recording upon and reproducing from a magnetic record medium, which commonly is in the form of magnetic material supported upon a suitable backing or carrier.

Such heads commonly are in the form of an electromagnet having closely spaced pole tips which define a narrow non-magnetic gap across which a record medium may be moved. In the case of a recording head, the signals to be recorded are fed to one or more coils wound around the electromagnet. In the case of a playback head associated with such a moving record medium, the movement of the record medium past the gap causes output signals to be generated in coils wound on the electromagnet.

The core of such a transducer head is usually of laminated magnetic material or powdered magnetic material, such as ferrite, or a combination of the two, and often is made in two matching halves. Each half is generally C-shaped, with the non-magnetic gap being formed between two confronting legs of the respective halves. The pole faces on opposite sides of the gap are usually tapered toward the front face of the head (i.e., the face across which the record medium moves) in order to give a high sensivity. Commonly the gap is formed by inserting between the pole faces a suitable non-magnetic material or by depositing a coating of non-magnetic material on at least one of the confronting pole faces. For many applications it is essential that the gap length be small compared with the smallest wave length to be recorded or reproduced. This requirement gives rise to great difficulty in the choice of a suitable gap spacer and in the assembly of the half cores and gap spacers into satisfactory head units.

The present invention is directed to a novel method of making such heads which overcome these difficulties and which enables a small gap to be provided in a relatively simple and accurate manner.

In accordance with a preferred embodiment of the present invention, the magnetic transducer head is manufactured by first positioning the parts of the core in assembled relationship. At the end where the non-magnetic gap is to be located, the pole faces are tapered so that they engage only at their extreme outer ends. The space between these tapering pole faces is filled with suitable non-magnetic material. Thereafter, the material of the core halves at the front face is removed to an extent sufficient to remove the contacting portions of the pole faces and to expose the non-magnetic gap material at the front face of the head.

It is an object of this invention to provide a novel and improved method of manufacturing a magnetic transducer head.

It is also an object of this invention to provide such a method which may be carried out in a relatively simple, economical and accurate manner.

Another object of this invention is to provide such a method which enables the provision of a relatively short gap length in the head.

Further objects and advantages of this invention will be apparent from the following detailed description of certain presently-preferred embodiments thereof, with reference to the accompanying drawing.

Figure 1:
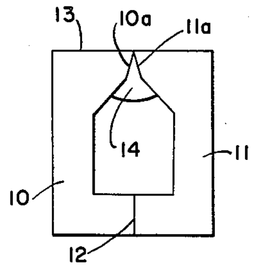
FIGURE 1 is a side elevational view of a magnetic transducer head in an intermediate stage of its manufacture in accordance with the method of the present invention.

Referring to FIGURE 1, in accordance with the present method, two identical magnetic core halves 10 and 11 are first fixedly positioned in the positions shown in FIGURE 1. This may be done by means of clamps (not shown), or by embedding the core halves in a metallic or non-metallic moldable material (not shown). As shown in FIGURE 1, each of the core halves is of generally C-shaped configuration in side elevation, having confronting pole faces 10*a* and 11*a* which engage each other at the front face 13 of the head and which diverge away from one another in a direction away from the front face 13. These diverging pole faces are shown as flat, but they may be curved, if desired. At the opposite end of the head, the core halves 10 and 11 engage each other at abutting end faces 12 over the complete cross-section of each core half.

With the core halves 10 and 11 fixed to each other in the position shown in FIGURE 1, a suitable non-magnetic material is deposited in the gap between the confronting pole faces 10*a* and 11*a*. This non-magnetic material is designated by the reference numeral 14 and in one practical embodiment it may be an epoxy resin cement which is poured into the tapered groove between the pole faces 10*a* and 11*a* and allowed to set.

Figure 2:
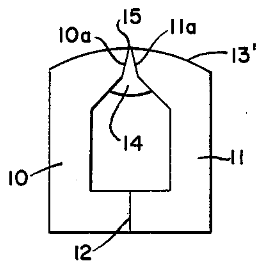
FIGURE 2 is a similar view of the FIGURE 1 head after its completion.

Following this, the front face 13 of the head is ground away to an extent sufficient to remove the outer tips of the pole faces 10*a* and 11*a* which engage each other. Thus, as shown in FIGURE 2, the completed head has at its outer face 13' a gap 15 which is filled by the non-magnetic material 14 and which is of the desired length for the recording and/or playback operation for which the head is intended. Preferably the outer face 13' of the finished head is rounded, as shown in FIGURE 2.

The degree of taper of the confronting pole faces 10*a* and 11*a* is such that after a reasonable amount of wear on the front face 13' (over which the record medium passes) the length of the gap at the front face of the head does not exceed the maximum allowable dimension.

Figure 3:
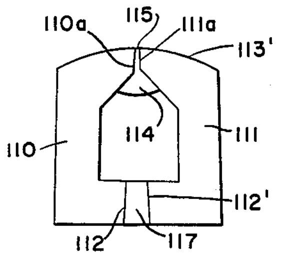
FIGURES 3, 4 and 5 are similar views showing completed heads of modified construction, all of which are manufactured in accordance with the method of the present invention.

FIGURE 3 shows a finished head constructed in accordance with an alternative embodiment of the present invention. In this embodiment, two approximately C-shaped core halves 110 and 111 are provided. Before assembly of the core halves together, the respective pole faces 110*a* and 111*a* of these core halves are machined so that they would extend parallel to each other if the opposite end faces 112 and 112' of the core halves were positioned abutting against each other.

When the core halves 110 and 111 are assembled together, a tapered insert 117 is disposed between their back end faces 112 and 112'. Desirably this spacer should be of high permeability material. As shown in FIGURE 3, this spacer is narrower at its inner end, which faces toward the pole faces 110*a* and 111*a*. Because of this, these pole faces now do not extend parallel to each other, but rather they are inclined angularly with respect to each other.

As in the embodiment shown in FIGURES 1 and 2, before the insertion of the non-magnetic material 114 in the space between the confronting pole faces 110*a* and 111*a*, these pole faces engage each other at their extreme outer ends. After the non-magnetic filler 114 has been inserted in the space between the pole faces, the front face of the head is ground away to provide the curved contour 113′ and to remove the contacting outer ends of the pole faces, so that the non-magnetic material 114 is exposed at the gap 115 between these pole faces at the front face of the head.

Figure 4:
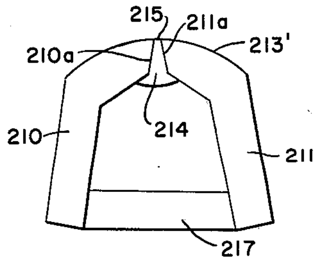

In the embodiment shown in FIGURE 4, the core members 210 and 211 are approximately L-shaped in configuration initially. A straight bar 217 is engaged between the back ends of the core members 210 and 211. This bar 217 has inclined end faces which make good contact over their entire cross-section with the sides of the L-shaped core members 210 and 211. The confronting pole faces 210*a* and 211*a* at the front side of the assembly are inclined angularly with respect to one another.

Before the insertion of the non-magnetic material 214, the confronting pole faces 210*a* and 211*a* engage each other at their extreme outer ends. After the non-magnetic material 214 has been inserted in the space between the pole faces, the front face of the head unit is ground away to provide the curved contour 213′ and to provide the gap 215 at the front face of the head, at which the opposite pole faces 210*a* and 211*a* are spaced apart and the non-magnetic material 214 is exposed.

Figure 5:
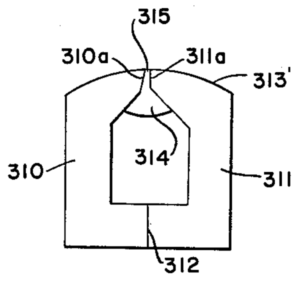

In the embodiment shown in FIGURE 5, the core is constituted by two halves 310 and 311. The inclination needed to provide the tapered space between the confronting pole faces 310*a* and 311*a* is provided by the pole face 310*a* only. The other pole face 311*a* is parallel to the opposite end faces of the core halves which engage each other at 312. In other respects, the method of constructing the FIGURE 5 head is identical to what has been described in detail already.

While the method of the present invention has been described with reference to various embodiments of a single magnetic transducer head, it may also be applied to the manufacture of a multi-channel head construction, in which a plurality of such cores are arranged in side-by-side relationship for recording on or reproducing from side-by-side parallel record tracks on a record medium. For this purpose, any number of cores may be stacked upon one another with suitable shielding means between them. The flaring or tapered groove extending over the whole stack is then filled with the non-magnetic material and the front face of the complete stack is ground away as described with reference to a single channel head construction.

From the foregoing it will be apparent that the present method may be carried out in a comparatively simple and economical manner. At the same time, the gap length of the finished head is accurately determined by the present invention and it may be sufficiently small to adapt the head for recording and reproducing quite high frequency signals.

While various embodiments of the present invention have been described herein, it is to be understood that various modifications, omissions and refinements involving departures from the embodiments shown and described may be adopted without departing from the spirit and scope of this invention.

Having thus described my invention, I claim:

1. A method of making a magnetic recording/reproducing head which comprises the steps of positioning a pair of opposite legs of a magnetic core with a pair of respecitve pole faces thereof in confronting relationship to one another, with said core legs being completely separate from one another at said confronting pole faces and with said pole faces contacting one another only along a single line contact at their outer edges and diverging away from each other inward from said single line contact at their outer edges, thereafter filling the space between said pole faces with non-magnetic adhesive material, and thereafter removing the material of said core legs only immediately adjacent to said single line contact between their confronting pole faces to form a narrow gap between the core legs at the outer edges of said pole faces at which said non-magnetic material is exposed.

2. The method of claim 1 wherein said core legs are approximately C-shaped in configuration and engage each other at the opposite extremities from said confronting pole faces across substantially their entire cross-section.

3. The method of claim 2 wherein said core legs are identical core halves and each of said pole faces extends obliquely with respect to the direction across said space between said confronting pole faces.

4. The method of claim 1 wherein one of said core legs has its pole face disposed substantially perpendicular to the direction across the space between the confronting pole faces and the pole face of the other core leg is disposed at an oblique angle to the direction across said space.

5. The method of claim 1 wherein a magnetic member is inserted between the ends of the core legs opposite said confronting pole faces thereof.

References Cited in the file of this patent

UNITED STATES PATENTS

| | | |
|---|---|---|
| 2,320,632 | McMaster | June 1, 1943 |
| 2,674,659 | Buhrendorf | Apr. 6, 1954 |
| 2,743,507 | Kornei | May 1, 1956 |
| 2,754,569 | Kornei | July 17, 1956 |
| 2,860,403 | Meyer | Nov. 18, 1958 |
| 2,895,015 | Zenel et al. | July 14, 1959 |
| 2,915,812 | Rettinger | Dec. 8, 1959 |
| 2,935,785 | Stein | May 10, 1960 |

OTHER REFERENCES

Tape Recorders—How They Work, by C. G. Westcott and R. F. Dubbe, published by Bobbs-Merril, New York, copyright 1956, page 125 relied upon.